(12) United States Patent
Asano et al.

(10) Patent No.: US 7,881,935 B2
(45) Date of Patent: Feb. 1, 2011

(54) SPEECH RECOGNITION DEVICE AND SPEECH RECOGNITION METHOD AND RECORDING MEDIUM UTILIZING PRELIMINARY WORD SELECTION

(75) Inventors: Yasuharu Asano, Kanagawa (JP); Katsuki Minamino, Tokyo (JP); Hiroaki Ogawa, Chiba (JP); Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 1138 days.

(21) Appl. No.: 10/019,125

(22) PCT Filed: Feb. 16, 2001

(86) PCT No.: PCT/JP01/01127

§ 371 (c)(1),
(2), (4) Date: May 10, 2002

(87) PCT Pub. No.: WO01/65541

PCT Pub. Date: Sep. 7, 2001

(65) Prior Publication Data

US 2002/0173958 A1    Nov. 21, 2002

(30) Foreign Application Priority Data

Feb. 28, 2000    (JP) .......................... P2000-051466

(51) Int. Cl.
*G10L 15/04*    (2006.01)
*G10L 15/14*    (2006.01)

(52) U.S. Cl. ...................... 704/252; 704/251; 704/256; 704/256.5

(58) Field of Classification Search ......... 704/251–252, 704/254–257
See application file for complete search history.

(56) References Cited

U.S. PATENT DOCUMENTS 4,618,983 A * 10/1986 Nishioka et al. ............ 704/239

(Continued)

FOREIGN PATENT DOCUMENTS

EP    0 677 835    10/1995

(Continued)

OTHER PUBLICATIONS

Chiang et al. "On Jointly Learning the Parameters in a Character-synchronous Integrated Speech and Language Model," Speech and Audio Processing, IEEE Transactions on, vol. 4, Issue 3, May 1996, pp. 167-189.*

(Continued)

*Primary Examiner*—James S Wozniak
*Assistant Examiner*—Jialong He
(74) *Attorney, Agent, or Firm*—Frommer Lawrence & Haug LLP; William S. Frommer; Paul A. Levy

(57) ABSTRACT

A speech recognition apparatus in which the accuracy in speech recognition is improved as the resource is prevented from increasing. Such a word which is probable as the result of the speech recognition is selected on the basis of an acoustic score and a linguistic score, while word selection is also performed on the basis of a measure different from the acoustic score, such as the number of phonemes being small, a part of speech being a pre-set one, inclusion in the past results of speech recognition or the linguistic score being not less than a pre-set value. The words so selected are subjected to matching processing.

6 Claims, 7 Drawing Sheets

U.S. PATENT DOCUMENTS

| | | | | |
|---|---|---|---|---|
| 4,882,757 | A | * | 11/1989 | Fisher et al. .................. 704/253 |
| 5,218,668 | A | * | 6/1993 | Higgins et al. ............... 704/200 |
| 5,349,645 | A | * | 9/1994 | Zhao ........................... 704/243 |
| 5,386,492 | A | * | 1/1995 | Wilson et al. ................ 704/252 |
| 5,634,083 | A | * | 5/1997 | Oerder ......................... 704/253 |
| 5,638,425 | A | * | 6/1997 | Meador et al. ............... 704/251 |
| 5,677,991 | A | * | 10/1997 | Hsu et al. .................... 704/255 |
| 5,710,864 | A | * | 1/1998 | Juang et al. .................. 704/238 |
| 5,710,866 | A | * | 1/1998 | Alleva et al. ............. 704/256.4 |
| 5,729,656 | A | * | 3/1998 | Nahamoo et al. ............ 704/254 |
| 5,764,851 | A | * | 6/1998 | Pengwu ....................... 704/242 |
| 5,937,383 | A | * | 8/1999 | Ittycheriah et al. ........... 704/255 |
| 5,960,447 | A | * | 9/1999 | Holt et al. .................... 704/235 |
| 5,963,903 | A | * | 10/1999 | Hon et al. .................... 704/254 |
| 5,991,720 | A | * | 11/1999 | Galler et al. .............. 704/256.5 |
| 6,138,095 | A | * | 10/2000 | Gupta et al. .................. 704/234 |
| 6,146,147 | A | * | 11/2000 | Wasowicz .................... 704/270 |
| 6,178,401 | B1 | * | 1/2001 | Franz et al. ................... 704/255 |
| 6,185,528 | B1 | * | 2/2001 | Fissore et al. ................ 704/232 |
| 6,233,559 | B1 | * | 5/2001 | Balakrishnan ............... 704/275 |
| 6,275,802 | B1 | * | 8/2001 | Aelten ......................... 704/255 |
| 6,374,220 | B1 | * | 4/2002 | Kao ............................. 704/255 |
| 6,484,141 | B1 | * | 11/2002 | Tomoeda ..................... 704/254 |
| 6,502,072 | B2 | * | 12/2002 | Jiang et al. ................... 704/255 |
| 6,539,353 | B1 | * | 3/2003 | Jiang et al. ................... 704/254 |
| 6,542,866 | B1 | * | 4/2003 | Jiang et al. ................... 704/255 |
| 6,757,652 | B1 | * | 6/2004 | Lund et al. ................... 704/254 |

FOREIGN PATENT DOCUMENTS

| | | |
|---|---|---|
| JP | 57-86899 | 5/1982 |
| JP | 58-52696 | 3/1983 |

OTHER PUBLICATIONS

Rose et al, "A Training Procedure for Verifying String Hypotheses in Continuous Speech Recognition," in Proc. of the IEEE International Conference on Acoustics, Speech and Signal Processing, 1995, pp. 281-284.*

Rose et al, "A Hidden Markov Model Based Keyword Recognition System". In Proc. ICASSP, 1990, pp. 129-132.*

Doyle. "Progressive Word Hypothesis Reduction for Very Large Vocabulary, Continuous Speech Recognition," Masters Thesis, McGill University, Sep. 1997, pp. 1-52.*

Quinton. "A syntactic analyzer adapted to speech recognition," Acoustics, Speech, and Signal Processing, IEEE International Conference on ICASSP '76. , Apr. 1976, pp. 453-456.*

Gauvain et al,"Speech-to-Text Conversion in French," Int. J. Pattern Recognition & A.I., 8, No. 1, 1994, pp. 1-29.*

IEEE Transactions on Speech and Audio Processing, vol. 1, No. 1, Jan. 1993, L.R. Bahl et al., "A Fast Approximate Acoustic Match for Large Vocabulary Speech Recognition", pp. 59-67, ISSN1063-6676.

IEEE Transactions on Speech and Audio Processing, vol. 1, No. 1, Jan. 1993, L.R. Bahl et al., "A Fast Approximate Acoustic Match for Large Vocabulary Speech Recognition", pp. 59-67, ISSN1063-6676.

* cited by examiner

SPEECH RECOGNITION DEVICE AND SPEECH RECOGNITION METHOD AND RECORDING MEDIUM UTILIZING PRELIMINARY WORD SELECTION

TECHNICAL FIELD

This invention relates to a speech recognition method and apparatus and a recording medium. More particularly, it relates to a speech recognition method and apparatus and a recording medium in which, even in a speech including a word having unstable acoustic characteristic values, speech recognition can be made to higher accuracy with a smaller amount of resources.

BACKGROUND ART

FIG. 1 shows a typical conventional speech recognition apparatus.

The speech uttered by a user is input to a microphone 1, which then converts the input speech into speech signals as electrical signals. These speech signals are fed to an A/D (analog/digital) converter 2, which then samples and quantizes the speech signals, as analog signals, output from the microphone 1, to convert the signals into speech data as digital signals. These speech data are sent to a characteristic value extraction unit 3.

The characteristic value extraction unit 3 acoustically processes the speech data from the A/D converter 2, from one suitably selected frame to another, to extract characteristic values, such as MFCC (Mel Frequency Cepstrum Coefficient), to send the extracted values to a matching unit 4. In addition, the characteristic value extraction unit 3 is able to extract other characteristic values, such as spectrum, linear prediction coefficients or linear spectral pairs.

Using the characteristic values from the characteristic value extraction unit 3, the matching unit 4 speech-recognizes the speech input to the microphone 1 (input speech) based on, for example, the continuous distribution Hidden Markov Model, as it references an acoustic model database 5, a dictionary database 6 and a grammar database 7 as necessary.

That is, the acoustic model database 5 memorizes an acoustic model, representing acoustic features, such as each phoneme or syllable in the language of the speech being recognized. Since here the speech recognition is based on the continuous distribution Hidden Markov Model method, the acoustic model used is the Hidden Markov Model. The dictionary database 6 memorizes a word dictionary stating the information on the pronunciation (phonemic information) for each word (vocabulary) being recognized. The grammar database 7 memorizes a set of grammatical rules (language models) stating how the words registered in the word dictionary of the dictionary database 6 are linked together. As the set of the grammatical rules, those rules which are based on the context free grammar (CFG) or a statistic word link probability (N-gram), for example, may be used.

The matching unit 4 references the word dictionary of the dictionary database 6 to connect to the acoustic model stored in the acoustic model database 5 to construct an acoustic model of the word (word model). The matching unit 4 also references the grammatical rules stored in the grammar database 7 to couple several word models and, using the so-connected word models, recognizes the speech input to the microphone 1, based on the characteristic values, in accordance with the continuous distribution Hidden Markov Model method. That is, the matching unit 4 detects a sequence of word models, having the maximum score (likeliness) of observation of the characteristic values of the time sequence output by the characteristic value extraction unit 3 and outputs a sequence of words corresponding to the sequence of the word models as the recognized results of the speech.

Specifically, the matching unit 4 cumulates the probability of occurrences of the respective characteristic values for a word sequence corresponding to the coupled word models. These cumulated values are scores, and a word sequence, which maximizes the score, is output as the result of word recognition.

The score is calculated in general by comprehensively evaluating an acoustic score accorded by an acoustic model memorized in an acoustic model database 5 and by a language model accorded by the set of grammatical-rules memorized in the grammar database 7.

That is, if, for example, the Hidden Markov Model method is applied, the acoustic model is calculated, from word to word, from the acoustic model forming the word model, based on the probability of observation (probability of occurrence) of the sequence off characteristic values output by the feature extraction unit 3. If a bi-gram is applied, the language score is found based on the probability of concatenation (coupling) of a word under consideration and a word directly previous thereto. The result of speech recognition is finalized based on the final score obtained on comprehensive evaluation of the acoustic score and the language score for each word.

Specifically, if, with a kth word $w_k$ in a word sequence made up of N words, the acoustic score of the word $w_k$ is expressed as $A(w_k)$ and the language score is expressed as $L(w_k)$, the last score S of the word sequence is calculated in accordance with the equation (1):

$$S = \acute{O}(A(w_k) + C_k \times L(w_k)) \qquad (1)$$

where $\acute{O}$ means taking a sum as k is changed from 1 to N and $C_k$ denotes a weighting to be applied to the language score $L(w_k)$ of the word $w_k$.

The matching unit 4 effects matching processing of finding N which maximizes the final score shown in the equation 1 and of finding word sequences $w_1, w_2, \ldots w_N$. These word sequences $w_1, w_2, \ldots w_N$ are output as the result of word recognition.

The result of the above processing is that, if a user has uttered e.g., "ニューヨークに行きたいです" ("I would like to go to New York", uttered as "new york ni ikitai desu"), the speech recognition device of FIG. 1 accords the acoustic and language scores to respective words, such as "ニューヨーク" ("New York", uttered as "new york"), "に" ("to", uttered as "ni"), "行きたい" ("would like to go", uttered as "ikitai") and "です" (uttered as "desu"). If final score obtained on comprehensive evaluation is maximum, the word sequences "ニューヨーク", "に", "行きたい", "です" are output as the result of the speech recognition.

It should be noted that if, in the above case, five words of "ニューヨーク", "行きたい", and "です" are registered in a word dictionary of the dictionary database 6, there are $5^5$ possible arrays of these five words that can be formed by these five words. Thus, in simple terms, the matching unit 4 has to evaluate these $5^5$ word sequences, to determine such a word sequence which is most suited to the enunciation made by the user, that is, such a word sequence which maximizes the final score. If the number of words registered in a word dictionary is increased, the number of the possible arrays of words, the number of which corresponds to the increased number of registered words, is equal to the number of words having an exponential equal to the number of words, so that the number of the word sequences to be evaluated is extravagant.

Moreover, since the number of words contained in the enunciation is unknown, not only the word sequence made up of five words but also word sequences made up of one, two, . . . words need to be evaluated. So, the number of the word sequences to be evaluated is further increased. It is, therefore, a crucial task to make efficient determination of that one of the extravagant number of the word sequences which is most probable as the result of the speech recognition from the viewpoint of the volume of calculations and the memory capacity to be used.

Among the methods for improving the efficiency in the volume of calculations and the memory capacity, there are an acoustic truncating method of truncating the score calculations when the acoustic score found in the course of finding the acoustic score falls below a pre-set threshold value, and a linguistic truncating method of wine-pressing the words as the object of score calculations based on the language score.

With this truncating method, the objects of the score calculations are wine-pressed based on a pre-set standard for judgment, such as the acoustic score in the course of the calculations as described above or the language score accorded to each word, to diminish the volume of the calculations. However, if the standard for judgment is too severe, even correct results of the speech recognitions are truncated to cause mistaken recognitions. Therefore, if the truncation method is applied, wine-pressing needs to be performed with a pre-set margin such as to prohibit truncation of correct results of speech recognition. The result is that it is difficult to diminish the volume of the calculations significantly.

If, in finding an acoustic score, the acoustic score is found for the totality of words to be calculated, the processing volume is increased. In this consideration, such a method has been proposed to use a certain portion of the calculations of the acoustic scores in common for plural words. As a method for this co-owning method, it is known to use an acoustic model in common for those words in a word dictionary having the same leading phoneme, as from the leading phoneme up to the last common phoneme and to use individual acoustic models as from the phoneme next following the last common phoneme to construct a sole tree structure network to find the acoustic score using this network. Specifically, with words "秋田" ("autumnal field", uttered as "akita") and "曙" ("dawn", uttered as "akebono"), with the phonemic information of "秋田" being [akita] and that of "曙" is [akebono], the acoustic score of "秋田" and "曙" can be calculated in common up to the second phoneme as from the first phoneme a, k. As for the remaining phonemes k, i, t and a of the word "秋田" and the remaining phonemes e, b, o, n and o of the word "曙", the acoustic score is calculated independently.

So, with this method, the processing volume for the acoustic score can be diminished significantly.

With this method, it is not possible to determine a word, the acoustic model of which is being calculated, from the common word portion for which an acoustic score is calculated in common. In the above example of the words "秋田" and "曙", if the acoustic score is calculated for the first and second phonemes a and k, it is not possible to identify whether the word, the acoustic model of which is being calculated, is "秋田" or "曙".

In this case, for "秋田", the word being processed can be identified to be "秋田" when the calculations of the acoustic score are started for the third phoneme. Similarly, for "曙", the word being processed can be identified to be "曙" when the calculations of the acoustic score are started for the third phoneme.

Thus, if a part of the calculations of the acoustic score is used in common, each word cannot be identified at the beginning of the calculations of the acoustic score for the word, thus the language score cannot be considered for the word. As a result, it is difficult to use the above-mentioned linguistic truncating method before starting the calculations of the acoustic score for the word, and unnecessary calculations will be done.

Further, if a part of the calculations of the acoustic score is used in common, the above-described network of the tree structure is formed for the totality of words in a word dictionary, and hence a large memory capacity is required for holding the network.

For improving the efficiency of the memory capacity and the processing volume, there is known a method of preliminarily selecting the words the acoustic score of which is to be calculated, without calculating the acoustic score of the totality of words in a dictionary, and to calculate the acoustic score only for the preliminarily selected words.

The method for preliminary selection is stated in, for example, L. R. Bahl, S. V. De Gennaro, P. S. Gopalakrishnan and R. L. Mercer, "A Fast Approximate Acoustic match for large Vocabulary Speech Recognition", IEEE Trans. Speech and Audio Proc., vol. 1, pp. 59-67, 1993.

This preliminary selection is performed using simpler acoustic models or a set of grammatical rules not particularly high in precision. That is, the preliminary selection is performed for the totality of words in the word dictionary, so that, if the preliminary selection is performed using acoustic models or a set of grammatical rules high in precision, a large amount of resources, such as processing volume or memory capacities, are required for maintaining real-time operations. With the preliminary selection, employing a simplified acoustic model or set of grammatical rules, high-speed processing is possible with a smaller amount of resources, if the large vocabulary is to be dealt with.

In the speech recognition apparatus, in which the preliminary selection is applied, it is sufficient if the matching processing is performed only for the pre-selected words, so that, even in case acoustic models or set of grammatical rules high in precision are used, the matching processing can be carried out speedily with a small amount of resources. Thus, the speech recognition apparatus, performing preliminary selection, is particularly useful in speech recognition for a large vocabulary.

Meanwhile, the preliminary selection is performed after a terminal point likely to be true is found on completion of the matching processing employing a sequence of characteristic values for a given word, using a sequence of characteristic values as from the time point corresponding to the terminal point which is now a start point. That is, the preliminary selection is performed at a time point when the boundary between words contained in the continuously uttered speech has as yet not been finalized.

Therefore, if the beginning end point or the terminal end point of a sequence of characteristic values used in the preliminary selection is offset from the beginning end point or the terminal end point of a word in question, such a preliminary selection is carried out which uses a sequence of characteristic values containing characteristic values of a word directly preceding or directly following the word in question, or a sequence of characteristic values lacking in the characteristic values of beginning end or trailing end portions of the word in question, that is, using what may be termed an acoustically unstable sequence of characteristic values.

Thus, in the preliminary selection, employing a simple acoustic model, it may be an occurrence that a certain word contained in the speech is not selected. Such failure is selection is likely to occur in words with a smaller number of phonemes, such as adjuvant or adjuvant verb in Japanese or articles or prepositions in English.

If correct words have not been selected in the preliminary selection, no matching processing is carried out for the word, so that the result of speech recognition is in error.

There are such methods as moderating the standard for acoustic or linguistic judgment in word selection to increase the number of selected words, and employing an acoustic model or a set of grammatical rules high in precision.

However, if, in the preliminary selection, the standard for acoustic or linguistic judgment in word selection is moderated, a large number of words not particularly high in the probability as the result of the speech recognition become the object of the matching processing, thus significantly increasing the resource necessary for matching processing heavier in load per word than the preliminary selection.

On the other hand, if an acoustic model or a set of grammatical rules high in precision is used in the preliminary selection, the resource necessary for preliminary selection is increased significantly.

DISCLOSURE OF THE INVENTION

It is therefore an object of the present invention to provide a speech recognition apparatus in which the speech recognition can be improved in precision as the necessary resource is prohibited from being increased as far as possible.

The speech recognition apparatus according to the present invention includes selection means for selecting one or more first words from a group of words to be processed by speech recognition processing, based on a first measure calculated using the characteristic values, and for selecting one or more second words based on a second measure different from the first measure, and score calculation means for calculating the score of the first and second words selected by the selection means.

The selection means may select, as the second words, the words having the part of speech satisfying a pre-set condition, with the part of speech as the second measure. The selection means may select, as the second words, the words having the part of speech satisfying a pre-set condition, with the part of speech as the second measure. The selection means may select, as the second words, the words having the part of speech satisfying a pre-set condition, with the part of speech as the second measure. The selection means may further include storage means for memorizing the results of speech recognition. In this case, the selection means selects, as the second words, the words included in the results of speech recognition memorized in the storage means, with the stored state in the storage means as the second measure.

The speech recognition apparatus according to the present invention may further include inputting means for providing an input for correcting the results of speech recognition. The storage means stores the results of the speech recognition corrected by the input from the inputting means. The selection means calculates the score using characteristic values of the speech to select the first word based on the score.

The speech recognition method according to the present invention includes a selection step of selecting one or more first words from a group of words to be processed by speech recognition processing, based on a first measure calculated using the characteristic values, and for selecting one or more second words based on a second measure different from the first measure, and a score calculation step of calculating the score of the first and second words selected by the selection step.

The recording medium according to the present invention includes a program including a selection step of selecting one or more first words from a group of words to be processed by speech recognition processing, based on a first measure calculated using the characteristic values, and for selecting one or more second words based on a second measure different from the first measure, and a score calculation step of calculating the score of the first and second words selected by the selection step.

In the speech recognition method and apparatus and the recording medium according to the present invention, one or more first words is selected from a group of words to be processed by speech recognition processing, based on a first measure calculated using the characteristic values, and one or more second words is selected based on a second measure different from the first measure. The score is calculated of the so-selected first and second words

BEST MODE FOR CARRYING OUT THE INVENTION

Figure 1:
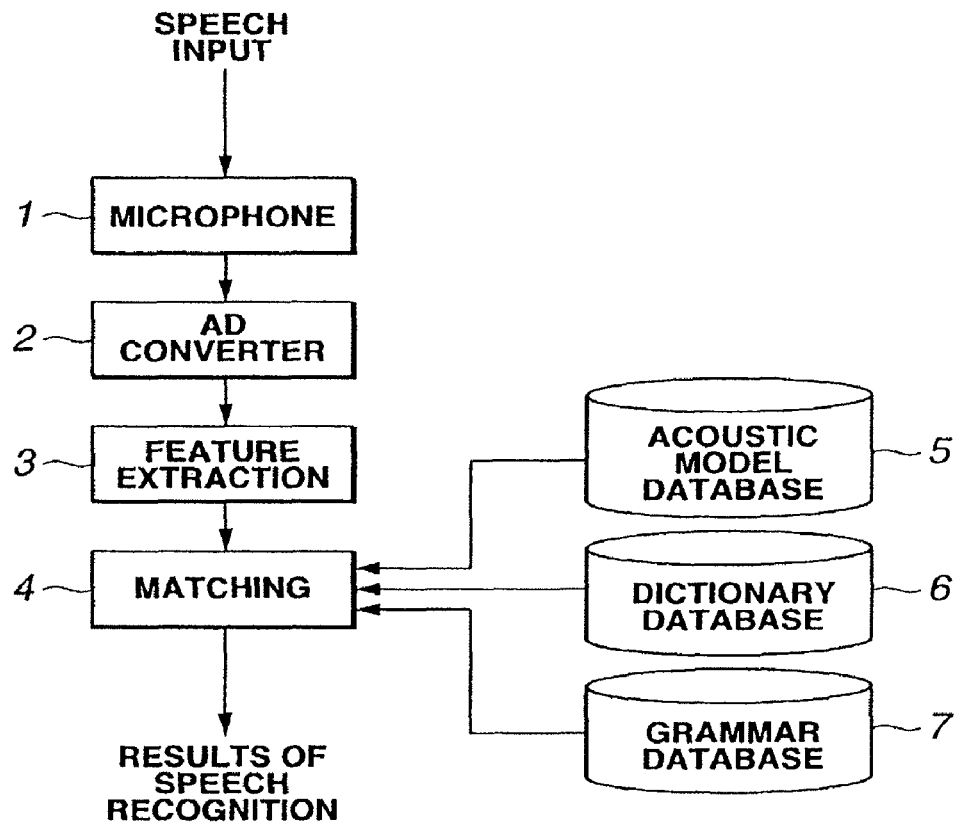
FIG. 1 is a block diagram showing a typical conventional speech recognition apparatus.
Figure 2:
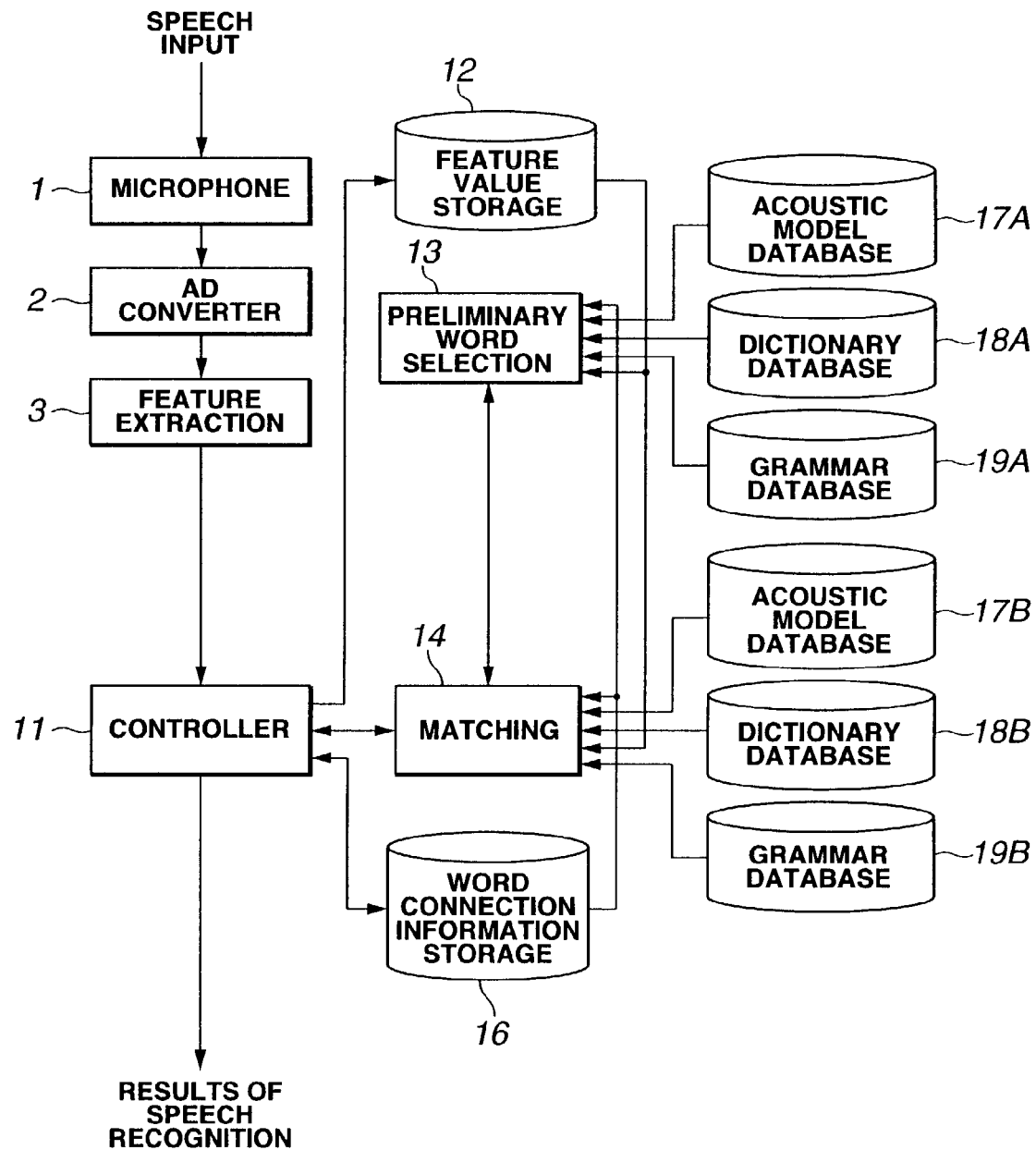
FIG. 2 is a block diagram showing an embodiment of a speech recognition apparatus according to the present invention.

FIG. 2 shows an embodiment of a speech recognition apparatus according to the present invention. In FIG. 2, the portions corresponding to those of the apparatus shown in FIG. 1 are depicted by the same reference numerals and are not explained specifically.

The sequence of characteristic values of the speech uttered by a user, output by the characteristic value extraction unit 3, is sent on the frame basis to a controller 11, which then sends the characteristic values from the characteristic value extraction unit 3 to a characteristic value storage unit 12.

The controller 11 references the word concatenation information stored in the word concatenation information stored in a word concatenation information storage unit 16. The controller 11 generates the word concatenation information, based on the acoustic or linguistic score, indicating the result of the matching processing obtained by the matching unit 14 performing the matching processing similar to that performed by the matching unit 4 of FIG. 1, to update the contents stored in the word concatenation information storage unit 16, based on the so-generated word concatenation information. Moreover, based on the word concatenation information, stored in the word concatenation information storage unit 16, the controller 11 finalizes and outputs the ultimate results of speech recognition.

The characteristic value storage unit 12 stores the sequence of characteristic values, sent thereto from the controller 11, until the results of the user speech recognition are obtained. Meanwhile, the controller 11 sends the time point of acquisition of the characteristic values output by the characteristic value extraction unit 3, termed herein the extraction time point, referenced to the start time point of a speech domain, to the characteristic value storage unit 12, along with the characteristic value. The characteristic value storage unit 12 stores the characteristic value along with the extraction time point. The characteristic values and the extraction time point, stored in the characteristic value storage unit 12, can be referenced as necessary by a word pre-selection unit 13 and by the matching unit 14.

Responsive to a request from the matching unit 14, the word pre-selection unit 13 performs preliminary word selection of selecting one or more words, processed for matching in the matching unit 14, using the characteristic values stored in the characteristic value storage unit 12, as it references the word concatenation information storage unit 16, an acoustic model database 17A, a dictionary database 18A and a grammar database 19A, as necessary.

The matching unit 14 performs the matching processing for words obtained as a result of the preliminary word selection processing from the word pre-selection unit 13, using the characteristic values stored in the characteristic value storage unit 12, as it references the word concatenation information storage unit 16, an acoustic model database 17B, a dictionary database 18B and a grammar database 19B, as necessary, under control by the controller 11.

The word concatenation information storage unit 16 memorizes the word concatenation information, supplied from the controller 11, until the results of recognition of the user's speech are acquired.

It should be noted that the word concatenation information denotes the relation (concatenation or union) of component words of the word sequence representing the ultimate result of speech recognition, and includes the acoustic score and the language score of each word as well as time points of the beginning end and terminal end of the speech portions associated with the respective words.

Figure 3:
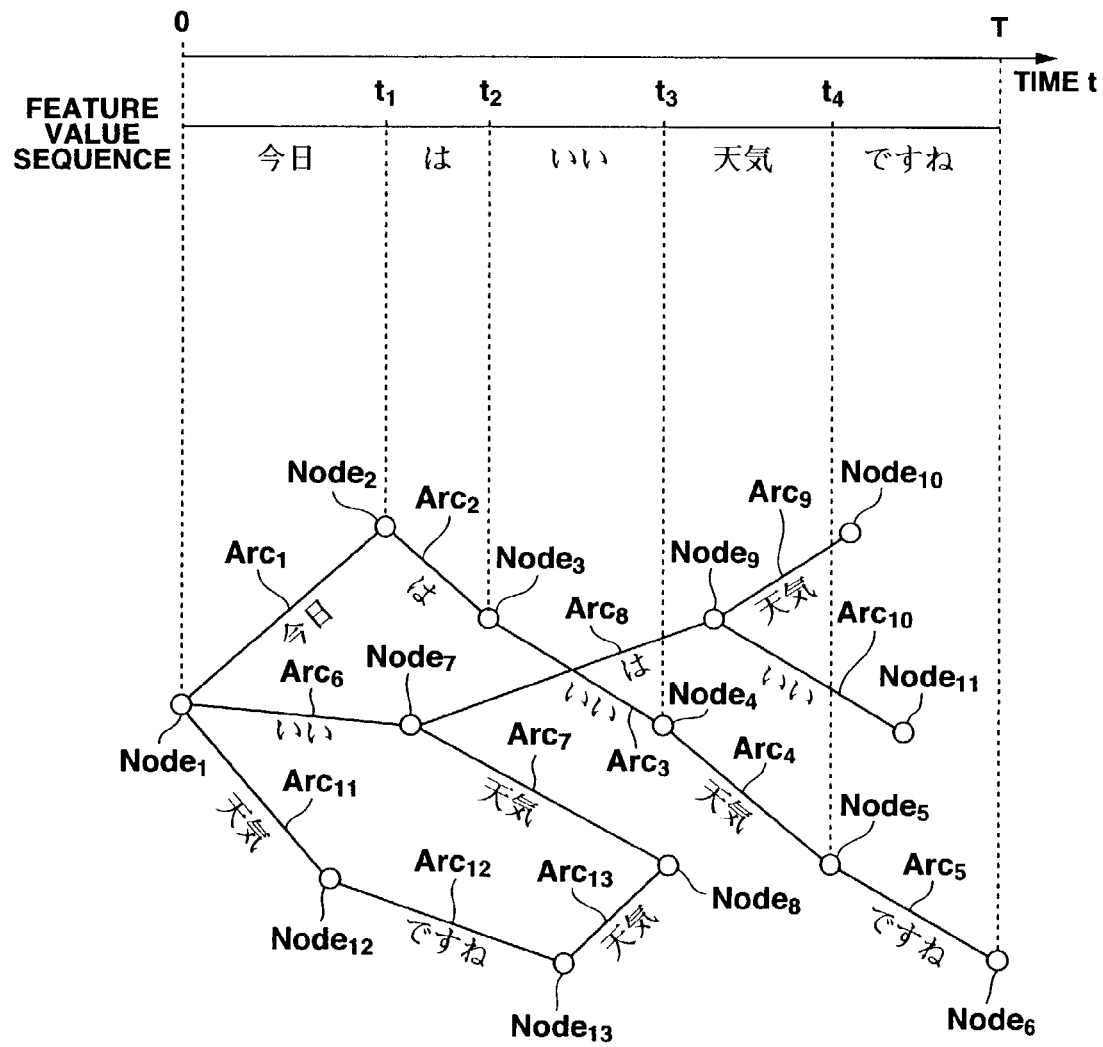
FIG. 3 illustrates the word concatenation information.

FIG. 3 shows, by a graph, the word concatenation information, stored in the word concatenation information storage unit 16.

In the embodiment of FIG. 3, the graphic structure as the word concatenation information is made up of arcs denoting words indicated by line segments interconnecting ○ marks in FIG. 3 and of nodes representing the boundary between words, indicated by the ○ marks in FIG. 3.

The node has the temporal information denoting the time point of extraction of the characteristic value associated with the node. Since the time point of extraction is the time point of acquisition of the characteristic value output by the characteristic value extraction unit 3, with the time point of beginning of a speech domain being ○, the temporal information owned by a node $Node_1$ corresponding to the start of a speech domain, that is the leading end of the first word, is ○. It is noted that the node represents the beginning end or a terminal end of an arc, with the temporal information owned by the beginning end node or the trailing end node being the beginning end and the terminal end of the enunciation of the word associated with the node, respectively.

In FIG. 3, the direction from left to right denotes the time lapse, so that, of the nodes lying at left and right ends of a given arc, the left node and the right node represent the beginning and terminal end nodes, respectively.

An arc has the acoustic score and score of the word associated therewith. A word sequence as candidate of the results of speech recognition is formed by sequentially concatenating the arcs with the node as a terminal end node as a beginning end node.

That is, in the controller 11, an arc corresponding to a word most probable as the result of the speech recognition is coupled to a node $Node_1$ representing the beginning end of a speech domain. In the embodiment of FIG. 3, an arc $Arc_1$ corresponding to "今日" ("Today", uttered as "kyou"), an arc $Arc_6$ corresponding to "いい" ("Good", uttered as "ii") and an arc $Arc_{11}$ "天気" ("Weather", uttered as "tenki") are concatenated. Whether or not a given word is a probable one as the result of speech recognition is determined based on the acoustic score and on the language score as found in the matching unit 14.

In similar manner, for a terminal end node $Node_2$, as a terminal end of an arc $Arc_1$ corresponding to "今日", a terminal end node $Node_7$ as a terminal end of an arc $Arc_6$ corresponding to "いい" and a terminal end node $Node_{12}$ as a terminal end of an $Arc_{11}$ corresponding to "天気", arcs corresponding to probable words are concatenated in the manner described above.

By the concatenation of the arcs as described above, one or more paths, made up of arcs and nodes, are formed from left towards, right, with the beginning point of the speech domain as a beginning point. If the totality of the paths reach the terminal end of the speech domain (at time T in FIG. 3), the acoustic and language scores owned by the arcs formed as from the beginning end until the terminal end of the speech domain are accumulated in the controller 11 to find the final score. The word sequence corresponding to the arc forming the path with the maximum final score is finalized and output as the result of the speech recognition.

Referring specifically to FIG. 3, if the maximum final score has been obtained for a path from the node $Node_1$ through the arc $Arc_1$ corresponding to "今日", node $Node_2$, the arc $Arc_2$ corresponding to "は" ("is", uttered as "wa"), node $Node_3$, the arc $Arc_3$ corresponding to "いい", node $Node_4$, an arc $Arc_4$ corresponding to the "天気", node $Node_5$ and the arc $Arc_5$ corresponding to "ですね" ("isn't it?", uttered as "desune") and node $Node_6$, a word sequence "今日", "は", "いい", "天気" and "ですね" is output as the result of the speech recognition.

In the above case, arcs are concatenated to the entire nodes in the speech domain to form a path extending from the beginning end to the terminal end of the speech domain. However, if a path constructed in the course of the path formation is found to be inadequate as the result of the speech recognition, the path forming process can be truncated at this time point, that is no arc is concatenated, as from such time point.

In accordance with the above-described path forming rule, a terminal end point of a given arc becomes the beginning node of one or more arcs concatenated next, so that, basically, a path is formed in a manner of spreading of branches or leaves of a tree. As an exceptional case, there is such a case wherein a terminal end of an arc coincides with a terminal end of another arc, that is wherein the terminal end node of an arc is the same common node as the terminal end node of the other arc.

If a bigram, for example, is used as the grammatical rules, two arcs extending from distinct nodes represent the same word and the end time of the enunciation of the word is the same, the ends of these two arcs coincide with each other.

In FIG. 3, the arc $Arc_7$ extending from the node $Node_7$ as a beginning end and the arc $Arc_{13}$ extending from the node Node$_{13}$ as a beginning end are both associated with "天気" and have the same time point of end of the speech enunciation, so that these arcs have the common node Nodes as same terminal end.

Although these nodes may not be of the same common node, the nodes are desirably the same node Node$_8$ in view of the memory capacity efficiency.

Although a bigram is used as the rules of grammars in FIG. 3, the common node may be used if, for example, a trigram, for example, is used.

The word concatenation information stored in the word concatenation information storage unit 16 may be referenced as necessary by the word pre-selection unit 13 and the matching unit 14.

Reverting to FIG. 2, the acoustic model databases 17A, 17B basically memorize the acoustic model explained in connection with the acoustic model database 5 of FIG. 1.

However, the acoustic model database 17B memorizes an acoustic model explained in connection with the acoustic model database 5 of FIG. 1. That is, if, in the acoustic model database 17A, only one pattern acoustic model which is not dependent on the forward and backward side contexts with respect to the phonemes or syllables is stored, there is memorized in the acoustic model database 17B not only an acoustic model not dependent on the forward or backward side contexts, but also an acoustic model dependent on the context across plural words or an acoustic model dependent on the context within a word.

Basically, the dictionary databases 18A, 18B memorize the word dictionary explained in connection with the dictionary database 16 of FIG. 1.

That is, the same set of words are registered in the word dictionaries of the grammar databases 18A and 18B. However, the word dictionary of the dictionary database 18B has stored therein the high precision phonemic information capable of processing to higher precision than is possible with the word dictionary of the dictionary database 18A. That is, if the sole phonemic information (reading) is stored in the word dictionary of the dictionary database 18A, plural sorts of the phonemic information is stored for each word in the word dictionary of the dictionary database 18A.

Specifically, for a word "お早う" ("Good morning", uttered as "ohayou"), the sole phonemic information "おはよう" ("Good morning", uttered as "ohayou") is stored in the word dictionary of the dictionary database 18A, whereas, in the word dictionary of the dictionary database 18B, "おはよー" ("Good morning", uttered as "ohayo-") or "おはよ" ("Good morning", uttered as "ohayo") are registered as the phonemic information.

The grammar databases 19A, 19B basically memorize the grammatical rules explained in connection with the grammar database 7 shown in FIG. 1.

However, the grammar database 19B memorizes the high precision grammatical rules higher in precision than those memorized in the grammar database 19A. That is, if the grammar database 19A memorizes the grammatical rules derived from the unigram (word occurrence probability), the grammar database 19B memorizes a bigram (word occurrence probability taking into account the relation to the directly previous word), a trigram (word occurrence probability taking into account the relation to the directly previous word and the second previous word) and the context free grammar.

As described above, a sole acoustic pattern of each phoneme and syllable is stored in the acoustic model database 17A, whilst plural acoustic patterns of each phoneme and syllable are stored in the acoustic model database 17B. In the dictionary database 18A, the sole phonemic information is stored for each word, whereas, in the dictionary database 18A, plural patterns of the acoustic model are stored. In the grammar database 19A, simple grammatical rules are stored in the grammar database 19A, whereas, in the grammar database 19B, grammatical rules of higher precision are stored.

So, the word pre-selection unit 13, referencing the acoustic model database 17A, a dictionary database 18A and a grammar database 19A, is able to promptly find the acoustic and language scores for a large number of words, although not to a higher accuracy. On the other hand, the matching unit 14, referencing the acoustic model database 17B, a dictionary database 18B and a grammar database 19B, is able to promptly find the acoustic and language scores for a tolerably large number of words to a higher accuracy.

Although the acoustic model databases 17A and 17B are differentiated as to the precision of the acoustic model memorized therein, the acoustic model memorized therein may also be the same. Similarly, the memory contents of the word dictionaries of the dictionary databases 18A, 18B may also be the same.

Figure 4:
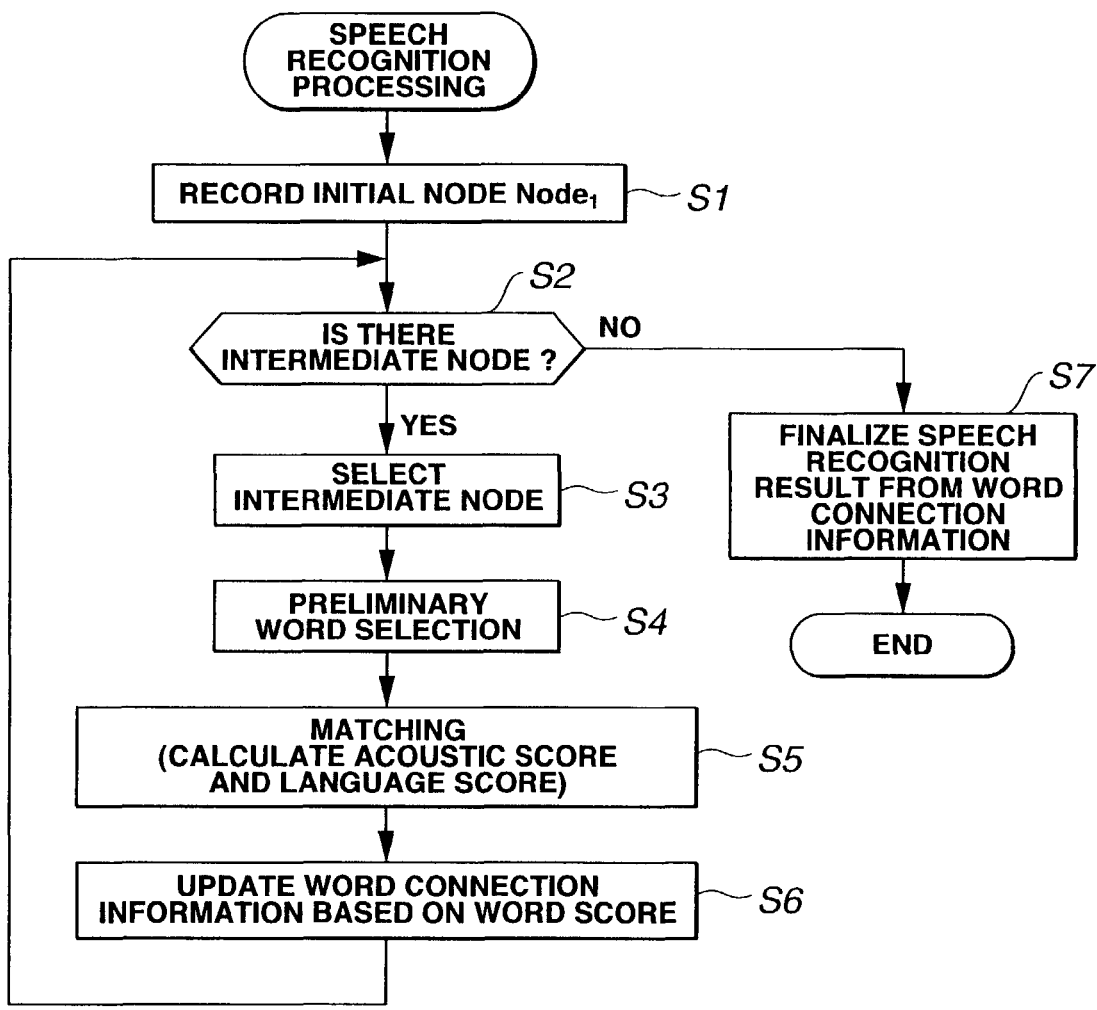
FIG. 4 is a flowchart for illustrating the processing of the speech recognition apparatus.

Referring to the flowchart of FIG. 4, the speech recognition processing by the speech recognition apparatus shown in FIG. 2 is explained.

When a user utters the speech, the speech so enunciated is converted by a microphone 1 and an A/D converter 2 into digital speech data, which is routed to the characteristic value extraction unit 3. The characteristic value extraction unit 3 then sequentially extracts the characteristic values of the speech from the speech data supplied thereto to send the extracted characteristic values to the controller 11.

The controller 11 recognizes the speech domain by some technique or other and, in the speech domain, routes the sequence of characteristic values furnished from the characteristic value extraction unit 3 to the characteristic value storage unit 12 in association with the extraction time of each characteristic value for storage therein.

At step S1 after the start of the speech domain, the controller 11 generates a node representing the beginning of the speech domain, referred to below as the initial node, and routes the so-generated node to the word concatenation information storage unit 16 for storage therein. That is, the controller 11 at step S1 causes the node Node$_1$ in FIG. 3 to be stored in the word concatenation information storage unit 16.

Moreover, the controller 11 at step S1 following the beginning of the speech domain generates a node representing the start of the speech domain, referred to below as the initial node, to send the so-generated node to the word concatenation information storage unit 16 for storage therein. That is, the controller 11 causes the node Node$_1$ in FIG. 3 to be stored at step S1 in the word concatenation information storage unit 16.

The controller 11 proceeds to step S2 and references the word concatenation information of the word concatenation information storage unit 16 to verify whether or not there is any intermediate node.

That is, in the word concatenation information, shown in FIG. 3, as described above, an arc is concatenated to the terminal end node to form a path extending from the beginning end to the terminal end of the speech domain. At step S2, such a node among the terminal end nodes to which an arc is as yet not connected and which has not reached the trailing end of the speech period, is retrieved as an intermediate node, such as nodes Node$_8$, Node$_{10}$ or Node$_{11}$ in FIG. 3 to determine whether or not there is such intermediate node.

As described above, the speech domain is recognized by some technique, whilst the time point corresponding to the terminal end node can be recognized by referencing tie time information of the terminal end node. So, whether or not the terminal end node not connected to an arc is an intermediate node not reaching the trailing end of the speech domain can be verified on comparing the last time point of the speech domain and the temporal information owned by the terminal end node.

If, at step S2, it is verified that there is any intermediate node, the controller 11 proceeds to step S3 to select one of the intermediate nodes present in the information connecting information as being a node determining the word as an arc connecting to the node. This node is sometimes referred to below as a node under consideration.

That is, if there is only one intermediate node in the word concatenation information, the controller 11 selects that intermediate node as being a node under consideration. Specifically, the controller 11 references the time information owned by plural intermediate nodes and selects such a node having the oldest time indicated by the time information, that is the node towards the beginning side of the speech domain, or such a node having the newest time indicated by the time information, that is the node closest to the terminal side of the speech domain, as the node under consideration. The controller 11 also accumulates the acoustic score and the language score owned by the arcs forming the path from the initial node to plural intermediate nodes, and selects the intermediate node forming the terminal end of the path which maximizes or minimizes the accumulated values as being the node under consideration.

The controller 11 outputs to the matching unit 14 a command to the effect that the matching processing is to be performed with the time information owned by the node under consideration as the start time point. This command is sometimes referred to below as the matching processing command.

On receipt of the matching processing command from the controller 11, the matching unit 14 sends the node under consideration and the time information it owns to the word pre-selection unit 13 to request it to perform word pre-selection processing. The controller 11 then transfers to step S4.

On receipt of the request for word pre-selection processing from the matching unit 14, the word pre-selection unit 13 at step S4 performs word pre-selection processing of selecting the candidates of words that are to be arcs concatenated to the node under consideration on the words registered in the word dictionary of the dictionary database 18A.

That is, the word pre-selection unit 13 recognizes the start time of the sequence of characteristic values used in calculating the language and acoustic scores, from the time information owned by the node under consideration, while reading out a sequence of the characteristic values, required as from the start time, from the characteristic value storage unit 12. The word pre-selection unit 13 forms the word model of each word registered in the word dictionary of the dictionary database 18A by connection of the acoustic model of the acoustic model database 17A to calculate the acoustic score based on the word model using the sequence of the characteristic values read out from the characteristic value storage unit 12.

The word pre-selection unit 13 calculates the language score of a word corresponding to each word model, based on the grammatical rules stored in the grammar database 19A. That is, the word pre-selection unit 13 finds the language score of each word based on, for example, a unigram.

The word pre-selection unit 13 may reference the word concatenation information to execute the calculations of the acoustic score of each word using a cross-word model which depends on the word directly previous to the word in question (a word corresponding to an arc the terminal end of which is the node under consideration). It should be noted that the volume of calculations of the acoustic score is larger when employing the cross-word model than otherwise.

In the word pre-selection unit 13, calculations of the language score of each word may be made based on the bigram prescribing the probability of the word in question concatenated to the directly previous word. However, if the language score is to be calculated based on the bigram or even a trigram, the volume of calculations is larger than if the unigram is used for calculations.

When the word pre-selection unit 13 finds the acoustic and language scores of each word as described above, it finds the score, referred to below as word score, which represents the comprehensive evaluation of the acoustic and language scores, as a first measure, to route upper L values thereof to the matching unit 14 as being the words to be processed for matching.

Moreover, the word pre-selection unit 13 at step S4 selects one or more words registered in the dictionary database 18A, based on a measure different from that of the word score in which the acoustic score is reflected, to route the selected word(s) to the matching unit 14.

That is, the word pre-selection unit 13 selects those words registered in the dictionary database 18A and which are generally shorter in enunciation time, such as the words the number of phonemes and syllables of which are less than a pre-set value, for example, prepositions or articles in English and adjuvants or adjuvant-verbs in Japanese, without regard to the acoustic scores thereof, to send the selected words to the matching unit 14. In this case, the words having short enunciation time necessarily become the object of the matching processing.

The word selected based on the particular measure irrelevant to the acoustic score in the word pre-selection unit 13 as described above is termed a specified word.

On receipt of L words selected from the word pre-selection unit 13 based on the word score and the specified word as selected based on the pre-set condition (measure) irrelevant to the word score, the matching unit 14 at step S5 executes matching processing on the words.

That is, the matching unit 14 recognizes the start time of the sequence of characteristic values used in calculating the language and acoustic scores, from the time information owned by the node under consideration, to read out the sequence of the necessary characteristic values as from the start time. Moreover, the matching unit 14 references the dictionary database 18B to recognize the phonemic information of the word from the word pre-selection unit 13 and reads out the phonemic model associated with the phonemic information from the acoustic model database 17A to form a word model on concatenation.

The matching unit 14 calculates the acoustic score of the words from the word pre-selection unit 13, using the sequence of characteristic values read out from the characteristic value storage unit 12, based on the word model formed as described above. The matching unit 14 may reference the word concatenation information to execute the calculations of the acoustic score of the words based on a cross-word puzzle.

Moreover, the matching unit 14 references the grammar database 19B to calculate the language score of the words from the word pre-selection unit 13. That is, the matching unit 14 references e.g., the word concatenation information to recognize a word directly previous to the word from the word pre-selection unit 13 and a word directly previous to the directly previous word to find the language score of the word from the word pre-selection unit 13 based on the probability derived from the trigram.

The matching unit 14 finds the acoustic and language scores, for the totality of the L words and the specified words from the word pre-selection unit 13 to then transfer to step S6. The totality of the L words and the specified words are collectively termed selected words. At step S6, the word score is found for each of the selected words based on the comprehensive evaluation of the acoustic and language scores, while the word concatenation information stored in the word concatenation information storage unit 16 is updated, based on the word score.

That is, at step S6, the matching unit 14 finds the word score for the selected word and compares the word score to a pre-set threshold value to wine-press a word as an concatenate arc to the node under consideration from the selected words. The matching unit 14 sends the words left after the wine-pressing along with the acoustic and language scores and the end time of the word under consideration.

The terminal end time of a word is recognized from the time point of extraction of the characteristic values used in calculating the acoustic score. If plural extraction time points highly probable as the end time are obtained, the word left after the wine-pressing are sent, along with the end time and the corresponding language and acoustic scores, to the controller 11.

Meanwhile, the end time of the word is recognized from the time point of extraction of the characteristic values used in calculating the acoustic score. If plural time points of extraction highly probable as the end time are obtained, a set of the end time and the associated acoustic and language scores are sent to the controller 11 for the word in question.

On receipt of the acoustic and language scores of the word supplied from the matching unit 14 and the end time, the controller 11 extends the arc, for each word from the matching unit 14, with the node under consideration in the word concatenation information (FIG. 3) stored in the word concatenation information storage unit 16, to concatenate the arc to the terminal end node corresponding to the position of the end point. The controller 11 also accords the associated word and the acoustic and language scores to the arcs to accord the corresponding end time to the terminal end node of each arc as the time information. The controller 11 then reverts to step S2 to repeat the similar processing as described above.

Since the word concatenation information is sequentially updated based on the processing result of the matching unit 14, it is possible for the word pre-selection unit 13 and the matching unit 14 to perform the processing by exploiting the latest word concatenation information.

Meanwhile, the controller 11 provides for use of the terminal end nodes in common in updating the word concatenation information if this is possible.

On the other hand, if it is determined at step S2 that there exists no intermediate node, the controller 11 proceeds to step S7 to reference the word concatenation information to accumulate the word score for each path formed by the word concatenation information to find the final score. The controller 11 outputs the word sequence corresponding to the arc forming the path having the maximum final score as the result of speech recognition for the user's enunciation to complete the processing.

As described above, the word pre-selection unit 13 selects the word most probable as the result of speech recognition, based on the word score including the acoustic score calculated from the acoustic characteristic value, while selecting the words having unstable acoustic characteristic values having a small number of phonemes, such as adjuvants or adjuvant-verbs in Japanese or prepositions or articles in English, based on a measure irrelevant to the acoustic score calculated from acoustic characteristic values, these words being matching-processed in the matching unit 14, thus preventing deterioration of precision in the speech recognition otherwise caused by non-selection in the word pre-selection unit 13 of the words having unstable acoustic characteristic values.

Since the range of truncation (wine-pressing) at the time of word selection is not diminished, nor is an acoustic model or grammatical rules of higher precision used, in the word pre-selection unit 13, it is possible to minimize the resource necessary for processing by the word pre-selection unit 13 to improve the accuracy speech recognition.

Moreover, since the words having a small number of phonemes and unstable acoustic characteristic values are necessarily processed for matching, only the words having a large number of phonemes and hence more stable acoustic characteristic values may be selected in the word pre-selection unit 13 based on the word score including the acoustic score. In the word pre-selection unit 13, no failure of selection of correct words occurs in the word pre-selection unit 13 even if a simpler acoustic model or grammatical rules are used, as a result of which the precision in speech recognition can be improved at the same time as the resource required for processing in the word pre-selection unit 13 is diminished.

If the words selected in the word pre-selection unit 13 based on the word score including the acoustic score are only the words of a larger number of phonemes with relatively stable acoustic characteristic values, no failure in selection of correct words occurs even if the number of words selected based on the acoustic and language scores is diminished, as a result of which the accuracy in the speech recognition can be improved at the same time as the resource necessary for processing in the matching unit 14 is diminished.

In the above-described embodiment, the word pre-selection unit 13 selects the word with a shorter enunciation time, based on a measure which is the enunciation time, without regard to its acoustic score, to prevent the accuracy in speech recognition from being deteriorated by the words with unstable acoustic characteristic values not being selected by the word pre-selection unit 13. Alternatively, the word pre-selection unit 13 can be caused to select words based only on a measure irrelevant to the acoustic score, that is a measure irrelevant to the characteristic values of the speech, such as the language score, apart from the words selected based on the word score. In such case, it is similarly possible to improve the accuracy in speech recognition as the resource is diminished.

That is, the word pre-selection unit 13 can be caused to select words likely to be concatenated to a sequence of the (n−1) word towards a node under consideration of a path reaching the node under consideration, based only on the language score obtained from the grammatical rule derived from the statistic word concatenation probability (N-gram). Since the word is selected in this case without taking the acoustic score calculated from the characteristic values into account, it is possible to prevent the accuracy in the speech recognition from being deteriorated by failure in selection of such words the acoustic score of which is diminished by the unstable acoustic characteristic values and hence the word score of which is decreased.

Since the processing volume of calculations of the language score can be appreciably smaller than that of calculations of the acoustic score, it is possible to suppress the increase in the resource.

The word selection based only on the language score obtained from the grammatical rules derived from the statistic word concatenation probability can easily be achieved by getting the grammatical rules stored in the grammar database 19A.

Figure 5:
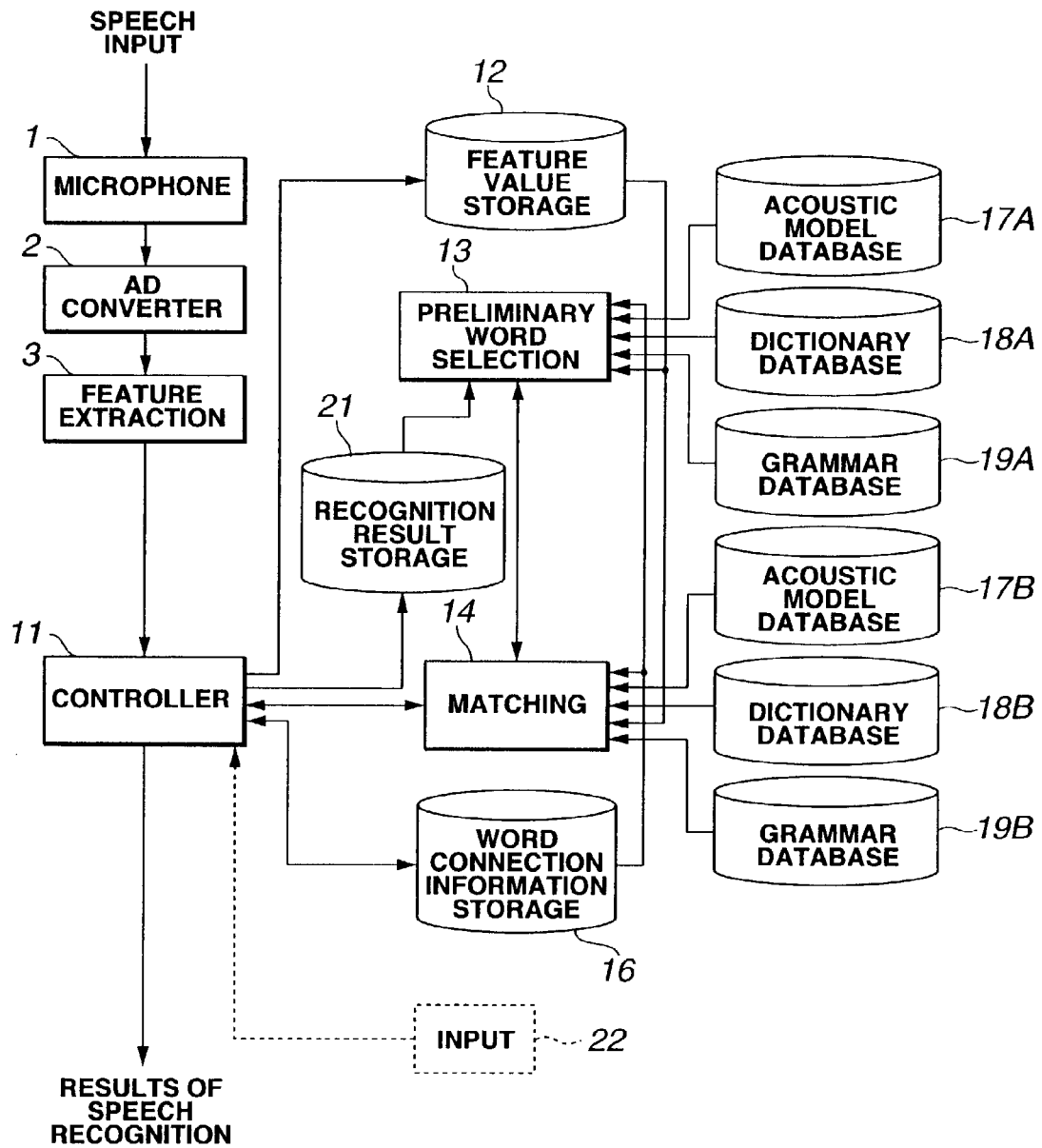
FIG. 5 is a block diagram showing another embodiment of a speech recognition apparatus according to the present invention.

FIG. 5 shows another embodiment of the speech recognition apparatus according to the present invention. The parts used in common with those of FIG. 2 are depicted by the same reference numerals and are not explained specifically. That is, the speech recognition apparatus of FIG. 5 is the same as that of FIG. 2 except that a recognition result storage unit 21 is newly provided in the apparatus of FIG. 2.

The recognition result storage unit 21 is adapted for being fed with the result of the speech recognition output by the controller 11. The recognition result storage unit 21 memorizes the result of the speech recognition. Meanwhile, the recognition result storage unit 21 has a recording capacity corresponding to one or more speech recognition result, and is designed so that, when the amount of the speech recognition result corresponding to the recording capacity has been stored therein, the recognition result supplied next will be stored in a manner of overwriting the oldest stored value. So, the hysteresis of the latest speech recognition result is stored in the recognition result storage unit 21. The word pre-selection unit 13 is able to reference the hysteresis of the latest speech recognition result stored in the recognition result storage unit 21.

Figure 6:
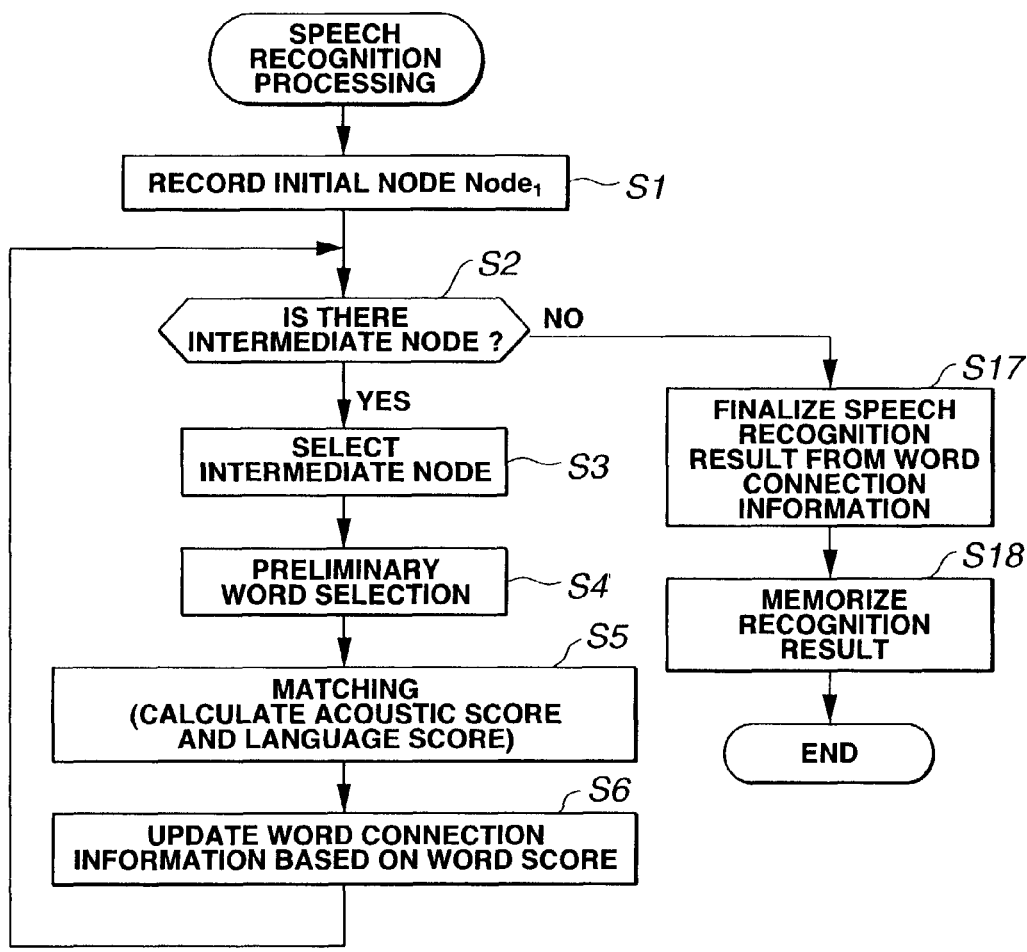
FIG. 6 is a flowchart for illustrating the processing of the speech recognition apparatus.

Referring to the flowchart of FIG. 6, the processing for speech recognition by the speech recognition apparatus of FIG. 5 is now explained.

At steps S11 to S17, the speech recognition apparatus of FIG. 5 basically executes the processing similar to the processing at steps S1 to S7 of FIG. 4.

At step S17, the controller 11 outputs the word sequence corresponding to the arc forming a path with the maximum last score as the result of speech recognition for the user's pronunciation. The controller 11 then proceeds to step S18 where the result of the speech recognition is sent to the recognition result storage unit 21 for storage therein to terminate the processing.

However, at step S14, the word pre-selection unit 13 performs the following word pre-selection processing.

As at step S4 in FIG. 4, the word pre-selection unit 13 reads out from the characteristic value storage unit 12 the sequence of the characteristic values as necessary since the start time point in the time information owned by the node under consideration, and calculates acoustic scores of the respective words registered in the word dictionary of the dictionary database 18A, using the sequence of the characteristic values read out from the characteristic value storage unit 12, while calculating the language scores thereof based on the grammatical rules stored in the grammar database 19A, to find the word scores (first measure) corresponding to the comprehensive evaluation of the acoustic and language scores. The word pre-selection unit 13 sends the words, the word scores of which are in upper L ranks, to the matching unit 14 as being the words to be subjected to the matching processing.

The word pre-selection unit 13 selects one or more of the words registered in the dictionary database 18A, based on a measure stored in the recognition result storage unit 21 (second measure) to send the selected word(s) to the matching unit 14.

Empirically, the words included in the speech enunciated by a user in the past are enunciated again in a majority of cases. So, the word pre-selection unit 13 of FIG. 5 selects the same words as those forming the results of speech recognition, stored in the recognition result storage unit 21, as specified words from the dictionary database 18A, and routes the so-selected words to the matching unit 14 as being the words to be subjected to the matching processing.

On receipt from the word pre-selection unit 13 of the L words selected based on the word scores and the specified words selected based on a pre-set condition (measure) that is irrelevant to the word score, herein the measure stored in the recognition result storage unit 21, the matching unit 14 performs matching processing on the so-received words.

In this case, the word pre-selection unit 13 selects words based on the measure which is irrelevant to the acoustic score, so that even a word in which the characteristic values of the speech exhibit marked fluctuations die to, for example, environmental noise or circuit noise and which is not selected by the word score which has reflected therein the acoustic score calculated from such characteristic values may be subjected to matching processing without employing the high precision acoustic model, thus allowing to improve the accuracy in speech recognition with smaller resources.

Meanwhile, the speech recognition apparatus may further be provided with an input unit 22, such as keyboard, actuated by a user when performing inputting processing for correcting the results of the speech recognition. If, in this case, the user actuates the input unit 22 to act on the result of the speech recognition output by the controller 11 to make such corrections, the controller 11 may be configured for causing the corrected result of the speech recognition to be stored in the recognition result storage unit 21, in place of or in combination with the result of the speech recognition output by no other than the user. This enables the precision in the speech recognition to be improved with the small volume of the resources, as in the case described above.

The above-described sequence of the processing operations can be performed by hardware or by software. In the latter case, the program forming the software is installed on e.g., a general-purpose computer.

Figure 7:
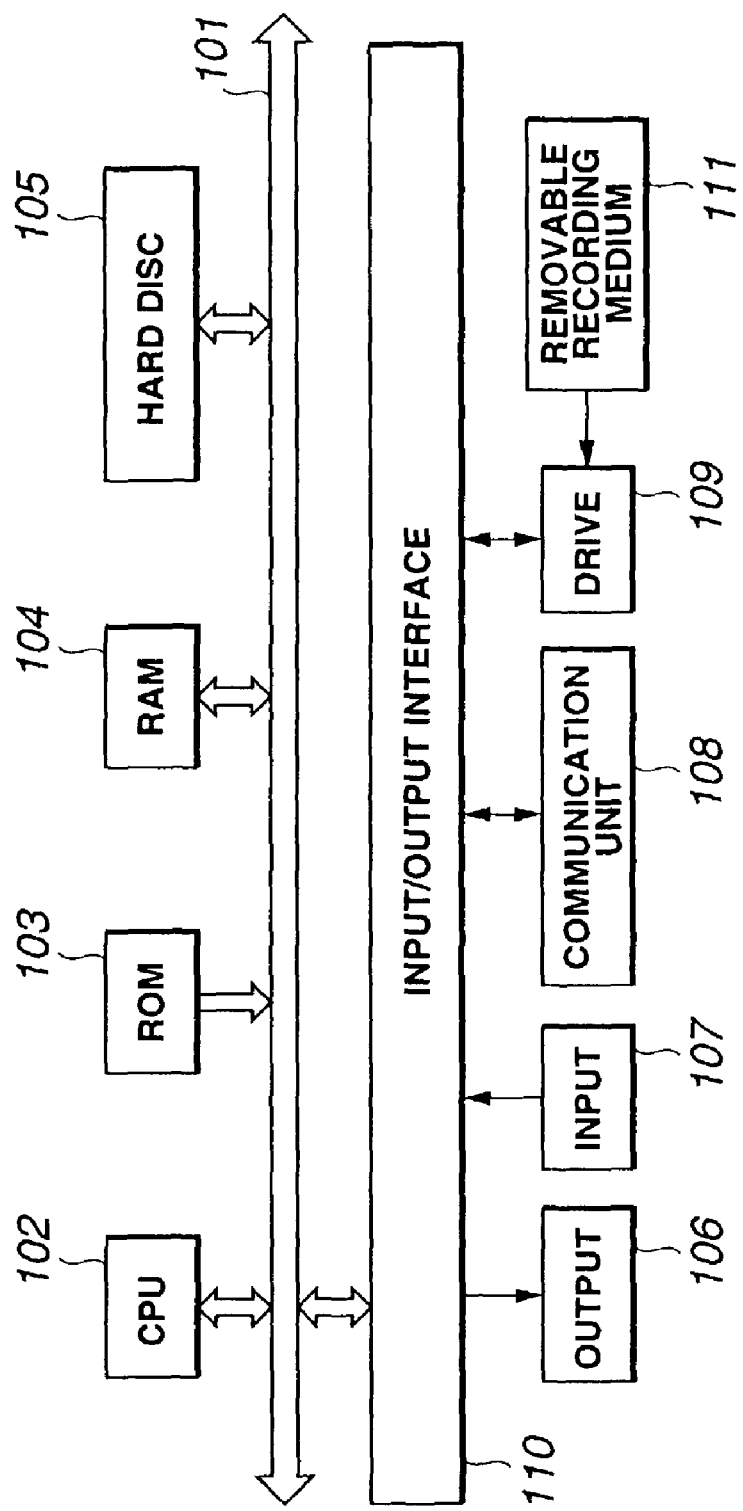
FIG. 7 is a block diagram showing a typical computer embodying the present invention.

FIG. 7 shows a typical computer in which the above-described sequence of operations is installed.

The program can be recorded at the outset in a hard disc 105 or a ROM 103 as a recording medium enclosed in a computer.

The program may be transiently or permanently stored or recorded in a removable recording medium 111, such as a floppy disc, a CD-ROM (Compact Disc Read-Only Memory), a MO (magneto-optical) disc, a DVD (Digital Versatile Disc), a magnetic disc or a semiconductor memory. This type of the removable recording medium may be purveyed as a so-called packaged software.

It should be noted that, instead of being installed on the computer from the above-mentioned removable recording medium 111, the programs may be transferred to the computer over a radio path through an artificial satellite for digital satellite broadcasting, from a downloading site, or over a cable through a network, such as LAN (Local Area network) or Internet, in which cases the computer may receive the program so transferred by a communication unit 108 to install the program on the enclosed hard disc 105.

The computer has enclosed therein a CPU (central processing unit) 102, to which an input/output interface 110 is connected over a bus 101. If fed with a command through the input/output interface 110, such as by a user acting on the input unit 107, formed by a keyboard, a mouse or a microphone, the CPU 102 executes the program stored in a ROM (read-only memory) 103. Alternatively, the CPU 102 loads a program stored in a hard disc 105, or a program read out from the removable recording medium 111 loaded on a drive 109 and installed on the hard disc 105 on a RAM (random access memory) 104 for execution. This enables the CPU 102 to perform the processing conforming to the above-described flowchart or the processing performed by the structure of the block diagram described above. The CPU 102 outputs the processed result as necessary through the input/output interface 110 from an output unit 106 formed by an LCD (liquid crystal display) or a loudspeaker, transmits the processed result from a transmitter 108 or records the processed result on the hard disc 105.

It should be noted that the processing steps stating the program to be executed by a computer for performing a variety of processing operations may be carried out in parallel or on the object basis, without it being necessary to perform the respective steps chronologically; in a sequence stated in the flowchart.

The program may also be processed by a computer or in a distributed fashion by plural computers. The program may also be transferred to and executed by a remote controller.

As described above, the word pre-selection unit 13 selects a word from the group of words registered in the dictionary database 18A, based on the word score calculated using characteristic values, while also selecting words having a short duration of enunciation, based on a measure, words likely to be concatenated linguistically to the directly previously recognized word or words included in the past result of speech recognition, to subject the so-selected words to the matching processing. So, the failure in the selection of a pre-set word may be prohibited from occurrence in the preliminary word selection processing, without it being necessary to use an acoustic model. The result is that deterioration in the precision in speech recognition may be prevented from occurring as the necessary resource is prevented from increasing as far as possible.

Moreover, the words to be subjected to the matching processing are selected based on a measure different from the word score, that is on a measure not influenced by the characteristic values of the speech, without relevancy to the acoustic score calculated using the characteristic values, so that, even in a noisy environment, the words to be subjected to the matching may be selected without being affected by the noise to improve the noise resistance of the speech recognition apparatus.

Since the words to be subjected to score calculations in the matching unit 14, are previously selected in the word pre-selection unit 13, the score calculations for respective words by the matching unit 14 may be performed independently for each word without forming a network of a tree structure having a portion of the calculations of the acoustic scores in common. If, in such case, the score calculations of the respective words are executed time-divisionally in the matching unit 14, it becomes possible to suppress the memory capacity necessary to procure for the calculations to a smaller value.

Since the score calculations by the matching unit 14 may be performed temporally independently, so that, by judiciously exploiting the memory capacity required for score calculations, it is possible to suppress the required memory capacity to a lower value.

In this case, when starting the score calculations for a given word, it is possible to identify the word, so that, in a early stage of the score calculations, it is possible to apply the language score to perform the truncation, as a result of which wasteful calculations caused by word identification being unfeasible may be eliminated.

The speech recognition apparatus shown in FIG. 2 or 5 may be applied to database retrieval by speech, to actuating a variety of equipment, to data inputting to a variety of equipment or to a speech dialog system. More specifically, the speech recognition apparatus may be applied to a database retrieval system for determining the map information responsive to an inquiry as to a place name by speech, an industrial robot for classifying packages responsive to a command by speech, a dictation system for creating the text by speech input in place of an input with a keyboard and to a dialog system by a robot having conversation with a user.

In the word pre-selection unit 13, the specified words selected on the basis of the number of phonemes or parts of speech can be registered in a word dictionary, apart from the other words.

In the above-described embodiments, the word pre-selection unit 13 selects L words, based on the word score, which is the comprehensive evaluation of the acoustic and language scores. It is however possible to select L words based solely on the acoustic scores.

If the words to be subjected to the matching processing are selected on the basis of a measure different from the word score having the acoustic score reflected therein, plural measures may be used as such measure, whereby both the words having a short speech enunciation time and the words included in the past results of speech recognition can necessarily be the words subjected to matching processing.

INDUSTRIAL APPLICABILITY

From a set of words subjected to processing for speech recognition, one or more first words are selected on the basis of a first measure calculated using characteristic values, whilst one or more second words are selected on the basis of a second measure different from the first measure, and the scores are calculated on the so selected first and second words. So, there is no risk of deterioration in the accuracy in speech recognition due to non-selection of the second words based on the first measure.

The invention claimed is:

1. A speech recognition apparatus in which a score reflecting an acoustic likelihood of the results of speech recognition of an input speech is calculated and in which the speech is recognized based on the score, comprising:

input means to receive the input speech;

extraction means for extracting characteristic values of said input speech, the input speech comprising a plurality of input words;

characteristic value storage means for storing characteristic values and an extraction time point associated with each characteristic value;

word concatenation information storage means for storing word concatenation information that is the relation of input words of a word sequence representing the results of speech recognition and includes acoustic scores, linguistic scores, time points of the beginning end and terminal end of speech portions associated with respective input words;

selection means for selecting one or more candidate first words from the plurality of input words to be processed by speech recognition processing, based on the concatenation information, and a word score that represents an evaluation of acoustic scores and language scores calculated using said characteristic values, and for selecting one or more candidate second words from the plurality of input words not based on the acoustic score, the candidate second words having unstable acoustic characteristic values with a number of phonemes and syllables less than a preset value, wherein the selection means is configured to select said candidate second words likely to be concatenated linguistically to a directly previously recognized word and configured to subject the concatenated candidate first and candidate second words to the matching processing;

score calculation means for calculating said score of said concatenated candidate first and candidate second words selected by said selection means referencing concatenation information of said first and second words; and finalizing means for finalizing a word string, as the recognition result of said speech, based on said score, wherein the selected one or more candidate first words based on the word score have a number of phonemes and syllables above the number of phonemes and syllables of the candidate second words and more stable acoustic characteristic values than the selected one or more candidate second words, wherein the word concatenation information is sequentially updated based on the score.

2. The speech recognition apparatus according to claim 1 further comprising:

storage means for memorizing the results of speech recognition;

wherein said selection means selects, as said candidate second words, the input words included in the results of speech recognition memorized in said storage means, with a stored state in said storage means as a measure not based on the non-acoustic score.

3. The speech recognition apparatus according to claim 2 further comprising:

inputting means for providing an input for correcting the results of speech recognition;

wherein said storage means stores the results of the speech recognition corrected by the input from said inputting means.

4. The speech recognition apparatus according to claim 1 wherein said selection means calculates said score using characteristic values of the speech to select said candidate first word based on said score.

5. A speech recognition method in which a score reflecting an acoustic likelihood of the results of speech recognition of an input speech is calculated and in which the speech is recognized based on the score, comprising:

an extraction step of extracting characteristic values of said input speech, said input speech comprising a plurality of input words;

a first storing step of storing characteristic values and an extraction time point associated with each characteristic value;

a second storing step of storing word concatenation information that is the relation of input words of a word sequence representing the results of speech recognition and includes acoustic scores, linguistic scores, time points of the beginning end and terminal end of speech portions associated with respective input words;

a selection step of selecting one or more candidate first words from the plurality of input words to be processed by speech recognition processing, based on the concatenation information, and a word score that represents an evaluation of acoustic scores and language scores calculated using said characteristic values, and for selecting one or more candidate second words from the plurality of input words not based on the acoustic score, the candidate second words having unstable acoustic characteristic values with a number of phonemes and syllables less than a preset value, wherein the selection step selects said candidate second words likely to be concatenated linguistically to a directly previously recognized word and to subject the concatenated candidate first and candidate second words to the matching processing;

a score calculation step of calculating said score of said candidate first and candidate second words selected by said selection step referencing concatenation information of said first and second words; and a finalizing step of finalizing a word string, as the recognition result of said speech, based on said score, wherein the selected one or more candidate first words based on the word score have a number of phonemes and syllables above the number of phonemes and syllables of the candidate second words and more stable acoustic characteristic values than the selected one or more candidate second words, wherein the word concatenation information is sequentially updated based on the score.

6. A non-transitory computer-readable medium having recorded thereon a program for causing a computer to perform speech recognition processing in which a score reflecting an acoustic likelihood of the results of speech recognition of an input speech is calculated and in which the speech is recognized based on the score, comprising:

an extraction step of extracting characteristic values of said input speech, said input speech comprising a plurality of input words;

a first storing step of storing characteristic values and an extraction time point associated with each characteristic value;

a second storing step of storing word concatenation information that is the relation of input words of a word sequence representing the results of speech recognition and includes acoustic scores, linguistic scores, time points of the beginning end and terminal end of speech portions associated with respective input words;

a selection step of selecting one or more candidate first words from the plurality of input words to be processed by speech recognition processing, based on the concatenation information, and a word score that represents an evaluation of acoustic scores and language scores calculated using said characteristic values, and for selecting one or more candidate second words from the plurality of input words not based on the acoustic score, the candidate second words having unstable acoustic characteristic values with a number of phonemes and syllables less than a preset value, wherein the selection step selects said candidate second words likely to be concatenated linguistically to a directly previously recognized word and to subject the concatenated candidate first and candidate second words to the matching processing;

a score calculation step of calculating said score of said candidate first and candidate second words selected by said selection step referencing concatenation information of said first and second words; and a finalizing step of finalizing a word string, as the recognition result of said speech, based on said score, wherein the selected one or more candidate first words based on the word score have a number of phonemes and syllables above the number of phonemes and syllables of the candidate second words and more stable acoustic characteristic values than the selected one or more candidate second words, wherein the word concatenation information is sequentially updated based on the score.

\* \* \* \* \*